(12) United States Patent
Deshpande et al.

(10) Patent No.: US 7,769,383 B2
(45) Date of Patent: Aug. 3, 2010

(54) METHOD AND SYSTEM FOR SIGNALING THE STATE OF SUPPLEMENTARY SERVICES

(75) Inventors: Manoj M. Deshpande, San Diego, CA (US); Kirti Gupta, San Diego, CA (US); Ranjith Jayaram, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 468 days.

(21) Appl. No.: 11/550,337

(22) Filed: Oct. 17, 2006

(65) Prior Publication Data

US 2008/0090570 A1 Apr. 17, 2008

(51) Int. Cl.
*H04W 36/00* (2009.01)
(52) U.S. Cl. .............. 455/436; 455/414.1; 455/422.1; 455/403; 370/328; 370/338
(58) Field of Classification Search ......... 370/259–271, 370/351–401, 310, 328, 338; 379/157–158; 455/403–560
See application file for complete search history.

(56) References Cited

U.S. PATENT DOCUMENTS

| | | | | |
|---|---|---|---|---|
| 5,504,804 A | * | 4/1996 | Widmark et al. | 455/63.2 |
| 6,487,196 B1 | * | 11/2002 | Verthein et al. | 370/352 |
| 7,200,385 B1 | * | 4/2007 | Wallenius et al. | 455/414.1 |
| 7,359,373 B2 | * | 4/2008 | Kuusinen et al. | 370/352 |
| 2004/0072593 A1 | * | 4/2004 | Robbins et al. | 455/560 |
| 2004/0154043 A1 | * | 8/2004 | Roman | 725/119 |
| 2005/0124326 A1 | * | 6/2005 | Belkin et al. | 455/414.1 |
| 2007/0070976 A1 | * | 3/2007 | Mussman et al. | 370/351 |
| 2007/0223370 A1 | * | 9/2007 | Spear | 370/218 |
| 2008/0072148 A1 | * | 3/2008 | Walter et al. | 715/700 |

FOREIGN PATENT DOCUMENTS

| | | |
|---|---|---|
| EP | 1081927 | 3/2001 |
| WO | 2005025196 | 3/2005 |
| WO | 2006010614 | 2/2006 |

OTHER PUBLICATIONS

International Search Report, PCT/US2007/081558—International Search Authority—European Patent Office—Nov. 5, 2008.
Written Opinion, PCT/US2007/081558—International Search Authority—European Patent Office—Nov. 5, 2008.

* cited by examiner

*Primary Examiner*—Kamran Afshar
*Assistant Examiner*—Marisol Fahnert
(74) *Attorney, Agent, or Firm*—Kam T. Tam; Peng Zhu

(57) ABSTRACT

The disclosure is directed to a mobile communication device that is capable of accessing different types of networks such as a circuit-switched network and a packet-switched network. When supplementary services are invoked involving the device, a protocol is used that signals between the device and a central server that maintains the state information for the supplementary services. In this way, hand-over between the two different types of networks may occur without interrupting supplementary services.

33 Claims, 5 Drawing Sheets

METHOD AND SYSTEM FOR SIGNALING THE STATE OF SUPPLEMENTARY SERVICES

BACKGROUND

1. Field

The present disclosure relates generally to telecommunications, and more particularly, to systems and methods to support a mobile communications device capable of communicating via two different types of communication networks.

2. Background

The demand for wireless information services has led to the development of an ever increasing number of wireless networks. CDMA2000 1x is just one example of a wireless network that provides wide area telephony and data services. CDMA2000 1x is a wireless standard promulgated by the Third Generation Partnership Project 2 (3GPP2) using code division multiple access (CDMA) technology. CDMA is a technology that allows multiple users to share a common communications medium using spread-spectrum processing. A competing wireless network that is commonly employed in Europe is Global System for Mobile Communications (GSM). Unlike CDMA2000 1x, GSM uses narrowband time division multiple access (TDMA) to support wireless telephony and data services. Some other wireless networks include General Packet Radio Service (GPRS) which supports high speed data services with data rates suitable for e-mail and web browsing applications, and Universal Mobile Telecommunications System (UMTS) which can deliver broadband voice and data for audio and video applications. Other access technologies include EV-DO and High-Speed Downlink Packet Access (HSDPA).

These wireless networks can generally be thought of as wide area networks employing cellular technology. Cellular technology is based on a topology in which the geographic coverage region is broken up into cells. Within each of these cells is a fixed base transceiver station (BTS) that communicates with mobile users. A base station controller (BSC) is typically employed in the geographic coverage region to control the BTSs and route communications to the appropriate gateways for the various packet-switched and circuit-switched networks.

As the demand for wireless information services continue to increase, mobile devices are evolving to support integrated voice, data, and streaming media while providing seamless network coverage between wide area circuit switched cellular networks, wide area packet switched cellular networks and wireless local area networks (LAN). Wireless LANs generally provide telephony and data services over relatively small geographic regions using a standard protocol, such as IEEE 802.11, or the like. The existence of wireless LANs provides a unique opportunity to increase user capacity in a wide area cellular network by extending cellular communications to the unlicensed spectrum using the infrastructure of the wireless LAN.

Recently, various techniques have been employed to enable mobile devices to communicate with different wireless networks such as packet-switched networks and circuit-switched networks. Accordingly, there are now instances in which a session initiated by a mobile device over a circuit-switched network may be handed-off to a packet-switched network. In some of these instances, the session may have involved participating in various supplementary services such as call waiting, call forwarding, call hold, etc. There exists the need, therefore, to accomplish such handoffs in a manner that maintains the state of the supplementary services seamlessly to the user. Moreover, such techniques should require little or no modification to existing circuit switched networks.

SUMMARY

One aspect of the present disclosure relates to a method for utilizing supplementary services in a mobile communications device capable of communicating over multiple access networks utilizing an IMS domain in communication with more than one access network. In accordance with this method an indication of a supplementary service is received from the IMS domain while communicating via a circuit-switched domain and a state of the supplementary services is signaled to the IMS domain.

It is understood that other aspects of the present disclosure will become readily apparent to those skilled in the art from the following detailed description, wherein it is shown and described only various aspects of the disclosure by way of illustration. As will be realized, the disclosure is capable of other and different aspects and its several details are capable of modification in various other respects, all without departing from the spirit and scope of the present disclosure. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various aspects of the disclosure and is not intended to represent the only aspects in which the disclosure may be practiced. The detailed description includes specific details for the purpose of providing a thorough understanding of the disclosure. However, it will be apparent to those skilled in the art that the disclosure may be practiced without these specific details. In some instances, well known structures and components are shown in block diagram form in order to avoid obscuring the concepts of the disclosure.

In the following detailed description, various techniques will be described in connection with the handoff of a mobile user from one network to another. A number of these techniques will be described in the context of a mobile communications device traveling through a circuit switched cellular network with one or more packet switched cellular network and/or wireless LANs dispersed throughout the cellular coverage region. The mobile communications device may be any suitable device capable of wireless telephony or data communications, such as a cellular phone designed for operation in a CDMA2000 1x network. The mobile communications device may be capable of employing any suitable protocol for accessing a wireless LAN, including, by way of example, IEEE 802.11. While these techniques may be described in the context of a cellular phone capable of communicating with an IEEE 802.11 network, those skilled in the art will readily appreciate that these techniques can be extended to other mobile communication devices capable of accessing multiple networks. For instance, these techniques may be applied to a mobile communications device capable of switching within or between a CDMA2000 network and a GSM/UMTS network. Accordingly, any reference to a cellular phone capable of communicating with an IEEE 802.11 network, or any other specific aspect, is intended only to illustrate various aspects of the present disclosure, with the understanding that these aspects have a wide range of applications.

Figure 1A:
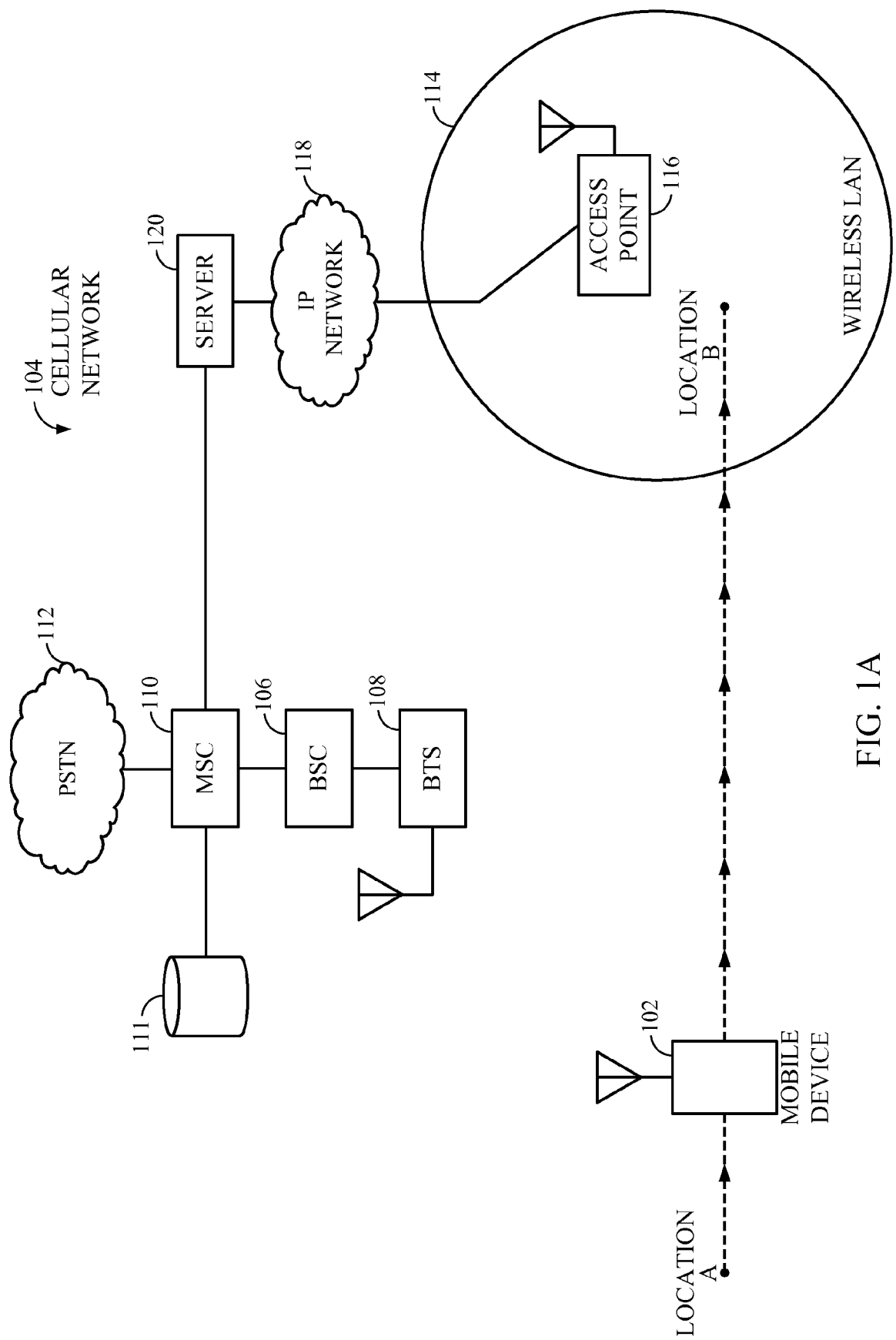
FIG. 1A is a conceptual block diagram of an aspect of a wireless communications system.

FIG. 1A is a conceptual block diagram of an aspect of a wireless communications system. A mobile device 102 is shown moving through a wide area cellular network 104 by a series of broken lines. The mobile device 102 may also be referred to as an user equipment (UE), an access terminal, a station (STA), a wireless communication device, a terminal, a user terminal, a mobile equipment, a subscriber unit, or some other terminology. The mobile device 102 may be a cellular phone, a smart phone, a cordless phone, a laptop computer, a PDA, a wireless device, a wireless modem, a handset, a handheld device, a satellite radio, a global positioning system, and so on. The cellular network 104 includes a BSC 106 supporting a number of BTSs dispersed throughout the cellular coverage region. A single BTS 108 is shown in FIG. 1A for simplicity of explanation. A mobile switching center (MSC) 110 may be used to provide a gateway to a public switched telephone network (PSTN) 112 and may be coupled to a database 111. Although not shown in FIG. 1A, the cellular network 104 may employ numerous BSCs each supporting any number of BTSs to extend the geographic reach of the cellular network 104. When multiple BSCs are employed throughout the cellular network 104, the MSC 110 may also be used to coordinate communications between the BSCs.

One or more wireless LANs may be dispersed throughout the cellular coverage region of the cellular network 104. A single wireless LAN 114 is shown in FIG. 1A as an example of any of a variety of packet-switched networks that may communicate with the mobile device 102. The wireless LAN 114 may be an IEEE 802.11 network, or any other suitable network. The wireless LAN 114 includes an access point 116 for the mobile device 102 to communicate with an IP network 118. A server 120 may be used to interface the IP network 118 to the MSC 110, which provides a gateway to the PSTN 112. The server 120, also known as interworking function, may be one or more separate systems providing various functions as described in more detail in FIG. 2. Additionally, FIG. 1A does not illustrate all the possible communication pathways between the different systems and networks.

When power is initially applied to the mobile device 102, it will attempt to access either the cellular network 104 or the wireless LAN 114. The decision to access a particular network may depend on a variety of factors relating to the specific application and overall design constraints. By way of example, the mobile device 102 may be configured to access the wireless LAN 114 when the service quality meets a minimum threshold. To the extent the wireless LAN 114 can be used to support mobile telephony and data communications, valuable cellular bandwidth may be freed up for other mobile users.

The mobile device 102 may be configured to continuously search for a beacon from the access point 116, or any other access point of a wireless LAN. The beacon is a periodic signal transmitted by the access point 116 with synchronization information. In the event that the mobile device 102 cannot detect a beacon, which might be the case if power is applied to the mobile device 102 at location A, then the mobile device 102 attempts to access the cellular network 104. The mobile device 102 may access the cellular network 104 by acquiring a pilot signal from the BTS 108. Once the pilot signal is acquired, a radio connection may be established between the mobile device 102 and the BTS 108 by means well known in the art. The mobile device 102 may use the radio connection with the BTS 108 to register with the MSC 110. Registration is the process by which the mobile device 102 makes its whereabouts known to the cellular network 104. When the registration process is complete, the mobile device 102 may enter into an idle state until a call is initiated, either by the mobile device 102 or the PSTN 112. Either way, an air traffic link may be established between the mobile device 102 and the BTS 108 to set up and support the call.

When the mobile device 102 moves through the cellular network 104 from location A to location B in the depicted aspect, it is now able to detect a beacon from the access point 116. Once this occurs, a radio connection may be established between the two by means well known in the art. The mobile device 102 then obtains the IP address of the server 120. The mobile device 102 may use the services of a Domain Name Server (DNS) to determine the server's IP address. The domain name of the server 120 may be delivered to the mobile device 102 over the cellular network 104. With the IP address, the mobile device 102 can establish a network connection with the server 120.

Figure 1B:
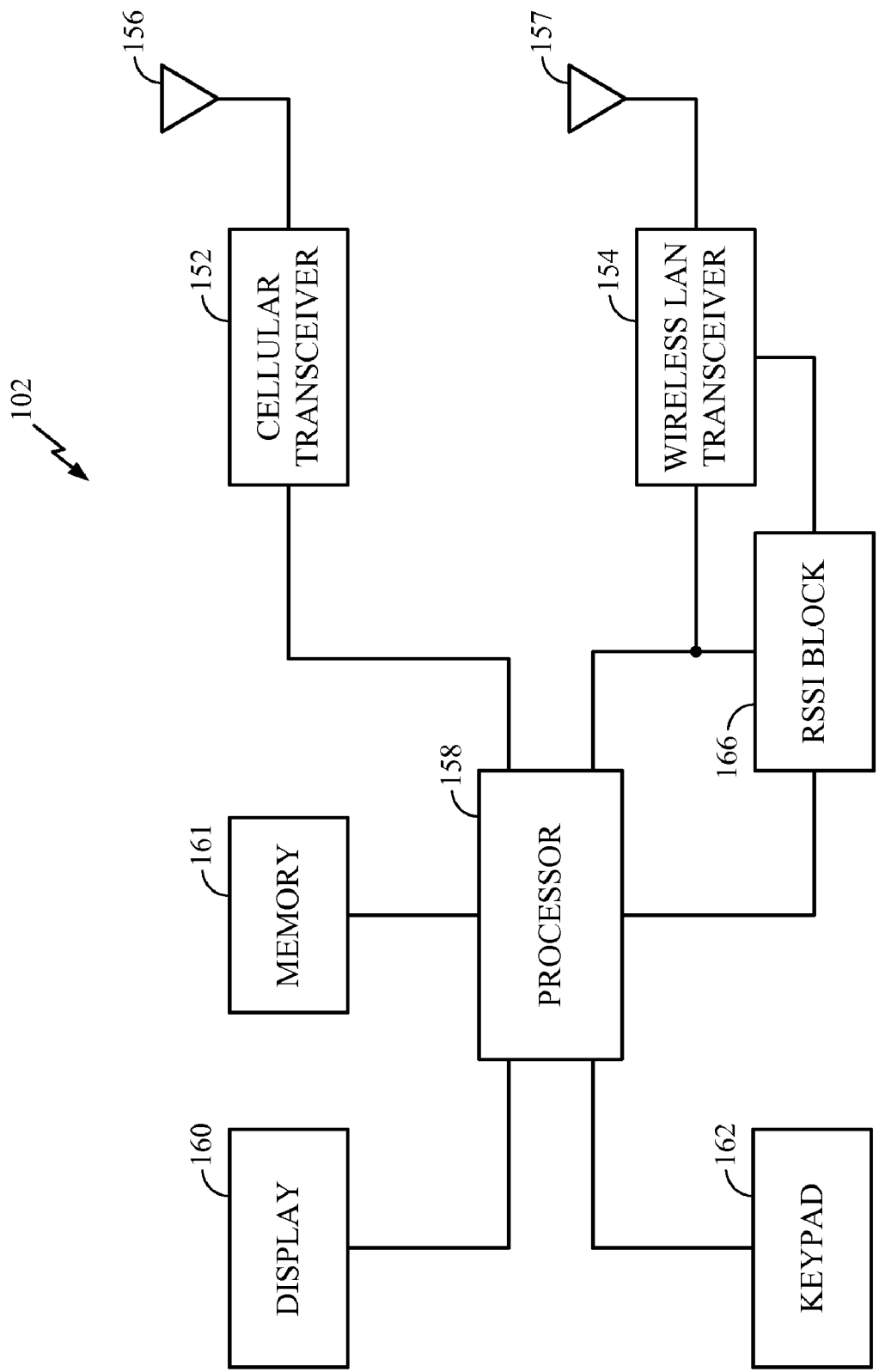
FIG. 1B is a functional block diagram illustrating an example of a mobile device capable of supporting both circuit switched cellular and wireless LAN communications.

FIG. 1B is a functional block diagram illustrating an example of a mobile device capable of supporting both circuit switched cellular and wireless LAN communications. The mobile device 102 may include a cellular transceiver 152 and a wireless LAN transceiver 154. In at least one aspect of the mobile device 102, the cellular transceiver 152 is capable of supporting CDMA2000 1x communications with a BTS (not shown), and the wireless LAN transceiver 154 is capable of supporting IEEE 802.11 communications with an access point (not shown). Those skilled in the art will readily appreciate, however, that the concepts described in connection with the mobile device 102 can be extended to other cellular and wireless LAN technologies. Each transceiver 152, 154 is shown with a separate antenna 156, 157, respectively, but the transceivers 202, 204 could share a single broadband antenna. Each antenna 156, 157, 207 may be implemented with one or more radiating elements.

The mobile device 102 is also shown with a processor 158 coupled to both transceivers 202, 204, however, a separate processor may be used for each transceiver in alternative aspects of the mobile device 102. The processor 158 may be implemented as hardware, firmware, software, or any combination thereof. By way of example, the processor 208 may include a microprocessor (not shown). The microprocessor may be used to support software applications that, among other things, (1) control and manage access to the cellular network and wireless LAN, and (2) interface the processor 158 to the keypad 160, display, 162, and other user interfaces (not shown). The processor 158 may also include a digital signal processor (DSP) (not shown) with an embedded software layer that supports various signal processing functions, such as convolutional encoding, cyclic redundancy check (CRC) functions, modulation, and spread-spectrum processing. The DSP may also perform vocoder functions to support telephony applications. The manner in which the processor 158 is implemented will depend on the particular application and the design constraints imposed on the overall system. Those skilled in the art will recognize the interchangeability of hardware, firmware, and software configurations under these circumstances, and how best to implement the described functionality for each particular application.

For certain purposes known in the art, the signal strength from the access point may be measured at the mobile device 102 with a received signal strength indicator (RSSI) block 166. The RSSI is most likely an existing signal that is fed back to the wireless LAN transceiver 152 for automatic gain control, and therefore, can be provided to the processor 158 without increasing the circuit complexity of the mobile device 102. Alternatively, the quality of the radio connection may be determined from the beacon.

The processor 158 may be configured to execute an algorithm to detect when handoff conditions exist and to initiate appropriate signaling with other connected systems. The algorithm may be implemented as one or more software applications supported by the microprocessor based architecture discussed earlier and stored in the accessible memory 161. Alternatively, the algorithm may be a module separate from the processor 158. The module may be implemented in hardware, software, firmware, or any combination thereof. Depending on the specific design constraints, the algorithm could be integrated into any entity in the mobile device 102, or distributed across multiple entities in the mobile device 102.

Figure 2:
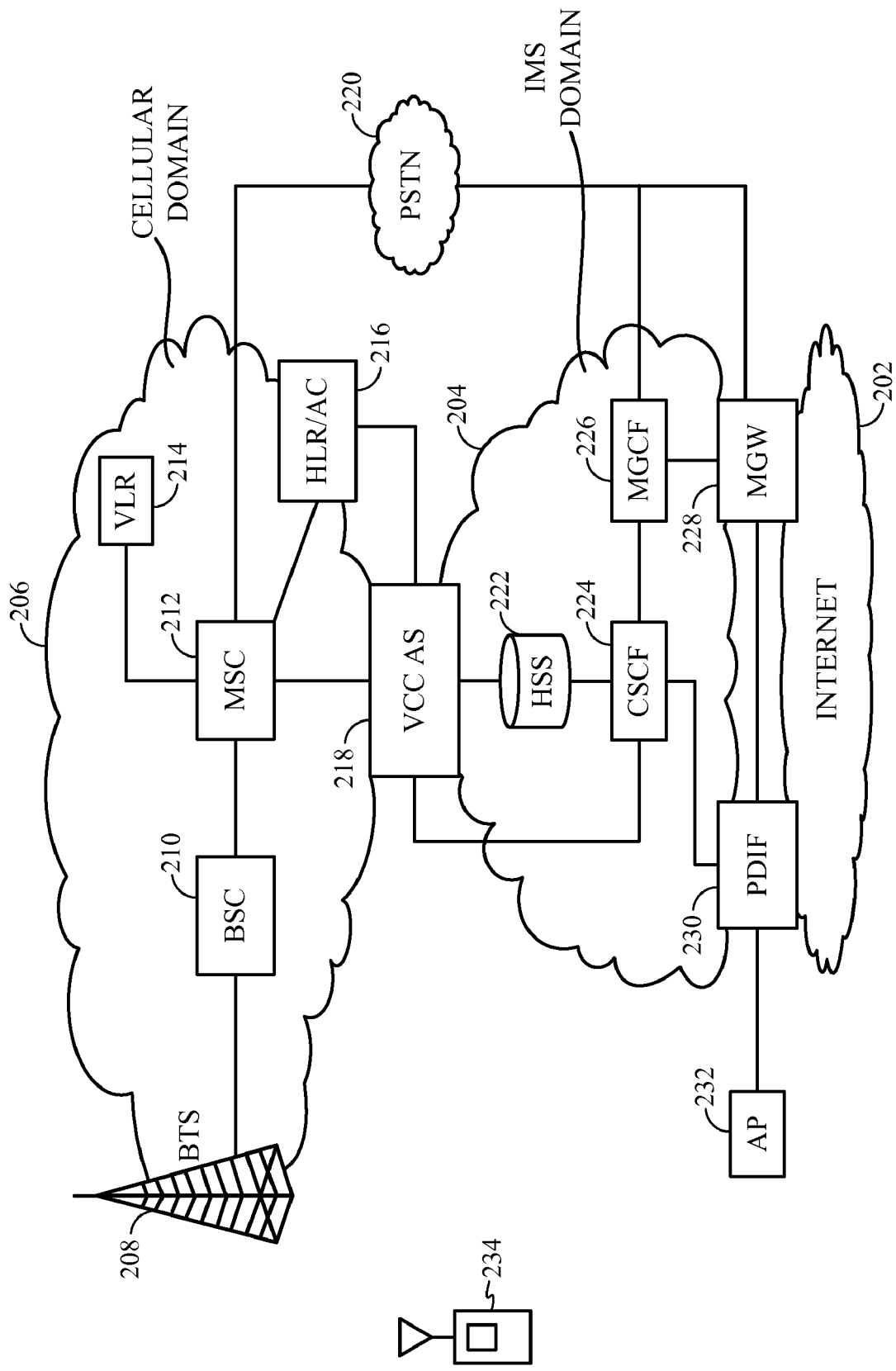
FIG. 2 depicts a more detailed conceptual block diagram of the gateway system of FIG. 1A.

To facilitate voice communications between a packet network and a circuit-switched network, such as the PSTN 112, the resources of the system 120 are utilized. Details of some functions or components of the system 120 are shown in more detail in FIG. 2. The system 120 of FIG. 1A is more comprehensively described as an IP Multimedia Subsystem (IMS) domain 204 as depicted in FIG. 2. The IMS domain has a number of different systems providing the following functions, for example: servers providing IP based services such as SIP servers and SIP registrars (known as Call Session Control Function, CSCF) 224, servers providing interworking with legacy PSTN networks such as MGCF 226 and MGW 228, servers providing interworking with CS cellular networks such as VCC AS 218. Also, a plurality of multimedia Application servers (not shown) can be included that provide different services to the mobile device 234 via the Internet 202. The specific servers identified in FIG. 2 are exemplary in nature and fewer or more servers can be included without departing from the scope of the present disclosure. In general, one function of the IMS domain 204 is that of mapping signaling and voice communications between the packet-switched network 206 and a circuit-switched network to thereby permit communications between the two. The IMS domain 204 may, for example, provide a SIP based network connection for a mobile device 234. The Session Initiation Protocol (SIP) is a signaling protocol used for establishing sessions in an IP network. A session could be a simple two-way telephone call or it could be a collaborative multi-media conference session. The ability to establish these sessions means that a host of innovative services become possible, such as voice-enriched e-commerce, web page click-to-dial, Instant Messaging with buddy lists, and IP Centrex services. Some other aspects illustrated by FIG. 2 is the inclusion of the HSS server 222 which is the home subscriber server and serves the same function as the HLR 216 in legacy circuit switched networks; and the connection between the PSTN 220 and the IMS domain 204. In the FIG. 2 also shown is a path between BSC (210) and Voice Call Continuity Application server (VCC AS) 218 through the MSC 212. On the wireless LAN side, the device 234 may use an access point 232 to reach a packet domain interface 230 within the IMS domain 204.

The other cellular network elements in FIG. 2 have been described previously such as the BTS 208, the BSC 210, the MSC 212, the VLR 214, the HLR/AC 216 and the PSTN 220. The mobile device 234 can access both the cellular network and a packet switched network, such as a wireless LAN, using the packet data interface 230 through the network access point 232.

In particular, the IMS domain may include a media gateway 228 that converts transmissions between a packet stream from the IP network and the voice circuit-switched network such as the PSTN 220. Thus, voice is carried in packets over the packet-switched network and the media gateway 228, while voice is carried over voice encoded communication circuits in a circuit-switched connection between the media gateway 228 and the PSTN 220. A media gateway control function (MGCF) 226 is also provided that operates to terminate SIP signaling and control functions of the media gateway 228. In this regard, the MGCF 226 typically performs conversion between SIP signaling in the IP session and SS7 signaling in the circuit-switched session.

A voice call continuity application server (VCC AS) 218 is also provided that anchors certain communication sessions. The VCC AS is part of a service that a network operator may provide to its subscribers. This service may be automatically included as a service or be a subscription service which a user must select and possibly pay additional fees for its capabilities. Original designs of a multimode network such as that in FIG. 1A envisioned that each time a mobile device initiated a circuit-switched call, then (if they are a subscriber to the VCC service) that call session would be anchored at the VCC AS upon call initiation. Anchoring involves the VCC AS storing sufficient information to restore or handoff a session if it becomes necessary. Typically such information includes the identity of the two parties participating in the session, the services being utilized during the session, and any transport specific information that is useful in defining the state of the network and the call during the session. Such a design automatically anchors all calls upon initiation regardless of whether that call ever actually requires handoff. Accordingly, resources of the VCC AS 218 are used for calls that do not require its functionality. Additionally, the procedure of anchoring the call adds a delay to the setup of the circuit-switched session which may be noticeable to a user. Moreover, this procedure may require modification of the MSC in the circuit-switched network to initiate/trigger the anchoring of a mobile originated call at the VCC AS 218.

The details of FIG. 2 are depicted as functional blocks and may be physically implemented in a variety of different ways. Each functional block may be one or more separate computer-based platforms for executing appropriate software or they may be logical functions of an application executing on the same computer-based platform.

Figure 3:
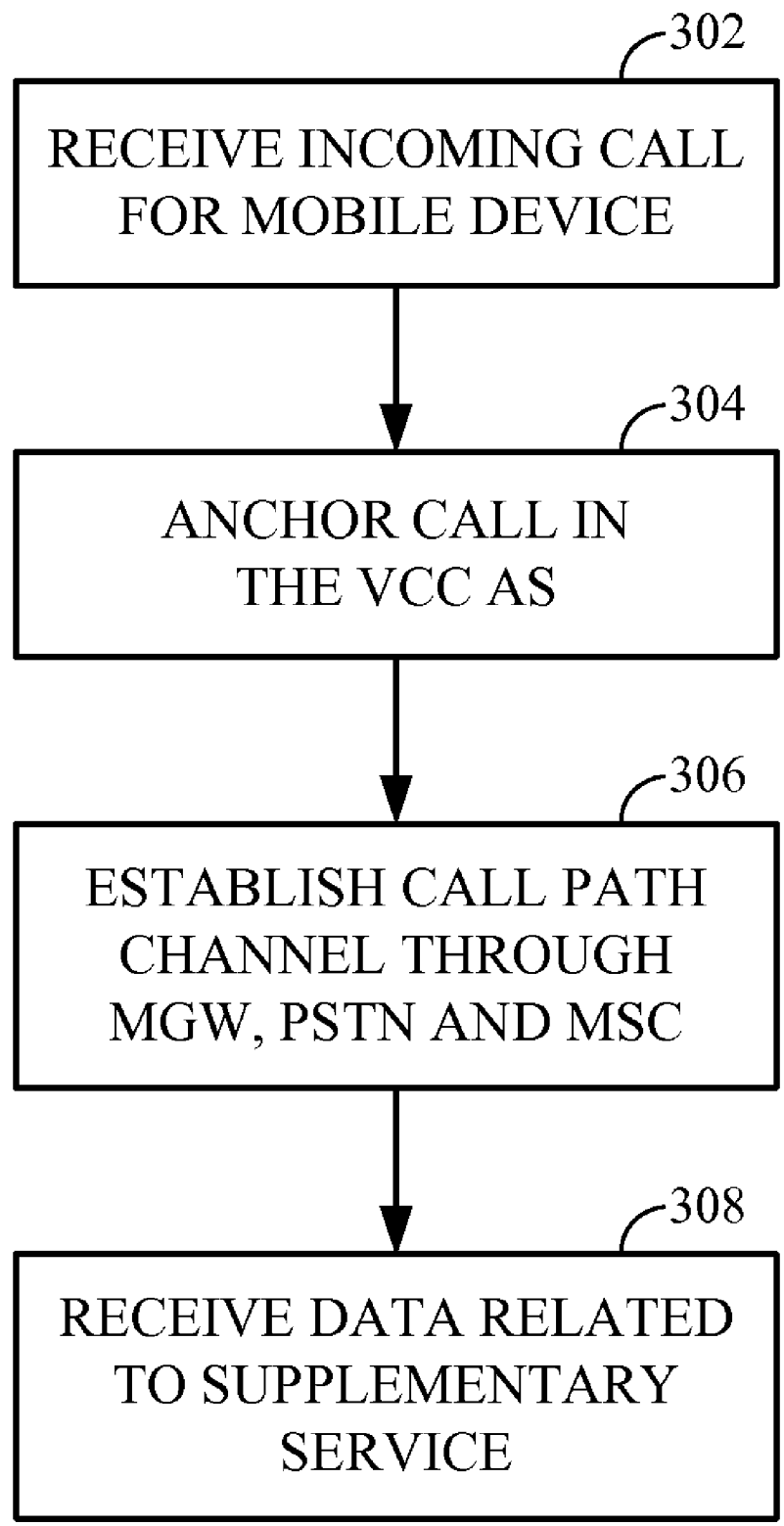
FIG. 3 depicts a flowchart of establishing a call involving supplementary services in accordance with the principles of the present disclosure.

In certain instances, the device 234 may be involved with a telephone call using the cellular domain 206. FIG. 3 depicts a flowchart of an exemplary method by which such calls are anchored in the IMS domain. First, in step 302, a call is established in the cellular domain that involves the mobile device. As part of establishing this call, the VCC AS anchors the call, in step 304. This establishes, in step 306, a call path between the PSTN and the mobile device through the MGW and the MSC. The signaling for controlling this channel is provided by both the CSCF and the MGCF.

Once the call is established and ongoing, a supplementary service may be invoked in step 308. Such services include, for example, call forwarding, call waiting, call diversion, call conferencing, etc. Traditionally, the user terminal and the MSC signal one another to control the operation of the supplementary service. For example, with call waiting, the user terminal may indicate to the MSC that it wants to connect to a second incoming call and put an existing call on hold while doing so. No other network entities are involved with or have knowledge of this selection by the user terminal. If this occurs and the user terminal is handed over from the cellular domain to the packet-switched domain, then the VCC AS would establish the packet-switched version of the call using the original anchoring information. This would result in the user terminal being connected to the first incoming call even though it had been connected to the second incoming call in the cellular domain.

Figure 4:
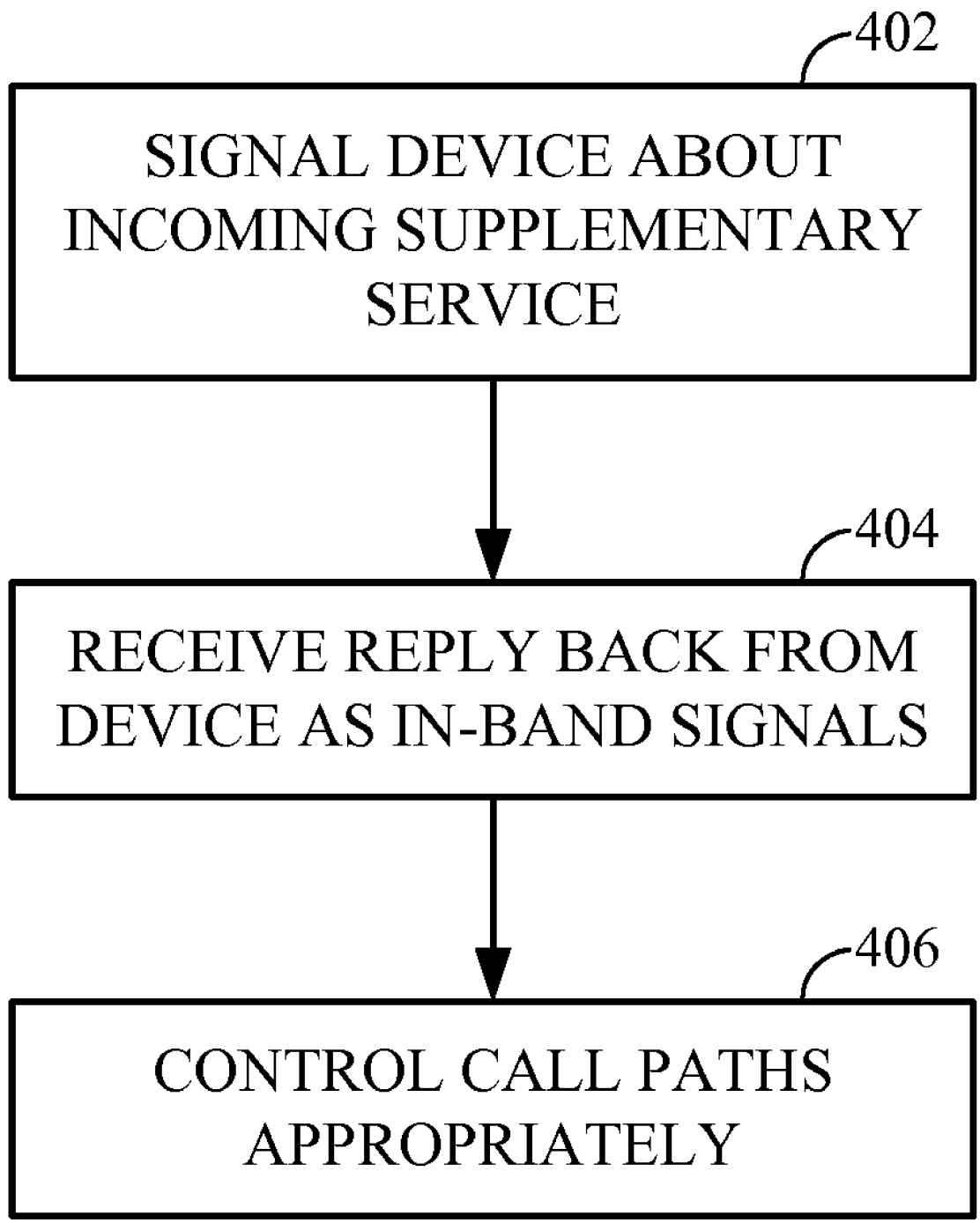
FIG. 4 depicts a flowchart of signaling between a user terminal and the IMS domain in accordance with the principles of the present disclosure.

FIG. 4 depicts a flowchart of an exemplary method of signaling the state of supplementary services in a seamless manner so that the above occurrence does not occur. The signaling technique described herein uses a protocol to send and receive information between the user terminal and the CSCF, even when the call is over the circuit-switched network, so that supplementary services are maintained even during hand-over between the cellular domain and the IMS domain.

In one particular aspect, the protocol involves assigning respective dual-tone multi-frequency (DTMF) codes to each respective supplementary service available. A DTMF code or a DTMF signaling message is a unique combination of consecutive DTMF tones that can be used to represent a particular signaling or call control message. As a new supplementary service becomes available, a new DTMF code may be assigned. These DTMF codes of the protocol would respectively correspond to the supplementary service and its attributes. For example, one DTMF code would indicate to a user terminal that an incoming call is available for call waiting. In response, there would be appropriate DTMF codes indicating that the user terminal wants to ignore the call or take the call. Another DTMF code would indicate that the user terminal wants to drop the current call as well. Another DTMF code may indicate that the user terminal wants to conference in the second call. One of ordinary skill will recognize that the particular DTMF codes that are assigned to each supplementary service and its attributes may vary by design without departing from the intended scope of the present disclosure.

DTMF signaling has been used for application layer signaling between end points (e.g., for menus in automated response systems) and for call control (e.g., the *67 and other codes used to control call features). In the case of call control the DTMF "message" is interpreted by the MSC (mobile switching center) handling the call. DTMF codes chosen for the method of this disclosure are selected from a special set of DTMF codes that are outside the set of call control signaling DTMF codes used by the MSC handling the call, and also not used by end-user application signaling. We refer to this set of DTMF signaling messages as VCC Supplementary Signaling Message Set. The MSC therefore interprets these signals as application layer DTMF messaging and passes these signals through transparently between the handset and the MGW. Both the handset and MGW must recognize this VCC Supplementary Signaling Message Set, interpret these codes and use them for supplementary services call control during VCC, instead of passing these DTMF tones on to the end user.

Furthermore, the protocol may be designed to include features for reliability. For example, the protocol may require explicit ACK signals and various re-transmit schemes to ensure information is passed in an error-free and reliable manner.

In FIG. 4, step 402, the CSCF may become aware of a call from the PSTN that invokes a supplementary service related to a call already in progress. The CSCF then identifies, according to the protocol, what DTMF codes should be sent to the user terminal. This digit information is passed to the MGCF so that the MGW can send DTMF codes over the established call channel to the user terminal. The MSC and the legacy cellular domain is configured to accept DTMF codes during a voice call and simply accepts the information through without any further manipulation. Between the MSC and the BSC, the DTMF codes are translated to digit information that is transmitted via the cellular network to the user terminal.

In response, the user terminal receives the embedded DTMF codes and determines how to handle the potential for invoking a supplementary service. In step 404, the user terminal creates an appropriately coded response according to the protocol and sends a reply through the MSC to the CSCF. The DTMF codes are exemplary in that they are in-band codes that the cellular domain accepts and transfers without modification. One of ordinary skill will recognize that other, similar in band signaling frequencies and codes may be used without departing from the scope of the present disclosure.

In step 406, the CSCF controls the call paths according to the reply received from the user terminal. For example, in a call waiting situation, the established channel is used to connect the second incoming call to the user terminal. As far as the MSC and the cellular domain are concerned, they have no knowledge of the change from the first call to the second call. Even if the MSC hands-over to another BTS, the established call channel (now carrying the second call) is seamlessly handed over. In the case where the hand-over is to the wireless LAN, the CSCF has the knowledge to connect the correct call to the user terminal. Thus, the IMS domain serves as the central controller for invoking and implementing supplementary services. The call channel with the cellular domain remains consistent but the CSCF and MGCF work together to ensure the correct voice call is being provided over that channel. The protocol between the CSCF and the user terminal, using signals natively handled by the cellular domain, allows the supplementary services to be invoked and controlled in this manner without involving the cellular domain. As a result, hand-over between the two domains can occur while maintaining the state of all supplementary services.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The various illustrative logical blocks, modules, circuits, elements, and/or components described in connection with the aspects disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for utilizing supplementary services in a mobile communications device capable of communicating over one or more access networks, comprising:
   establishing a call in a cellular domain having an anchor in a voice call continuity server in an IMS (Internet Protocol Multimedia Subsystem) domain, wherein the call further comprises a call path between a public switched telephone network and the mobile communications device through a media gateway and the cellular domain;
   exchanging signaling via the cellular domain with a call session control function in the IMS domain, wherein the signaling comprises an indication of a state of a supplementary service; wherein the exchanging further comprises:
      determining an appropriate dual-tone multi-frequency (DTMF) code that relates to utilizing the supplementary service from a set of DTMF codes outside of call control signaling codes used by the cellular domain for handling calls, wherein the appropriate DTMF code is interpreted by the cellular domain as an end-user application signaling code and is interpreted by the call session control function in the IMS domain as a supplemental service signaling code; and
      sending the appropriate DTMF code to indicate the state of the supplementary service transparently through the cellular domain to the call session control function in the IMS domain.

2. The method of claim 1, wherein the appropriate DTMF code is embedded along with a voice call portion.

3. The method of claim 1, wherein the supplementary service includes at least one of call waiting, call forwarding, call conferencing, or call hold.

4. The method of claim 1, wherein the indication is handled natively by the cellular domain.

5. A mobile communications device capable of communicating over multiple access networks having an IMS (Internet Protocol Multimedia Subsystem) domain in communication with the multiple access networks, the device comprising:
   a receiver circuit capable of receiving data from the multiple access networks;
   a processor configured to execute instructions to:
      establish a call in a cellular domain having an anchor in a voice call continuity server in an IMS domain, wherein the call further comprises a call path between a public switched telephone network and the mobile communications device through a media gateway and the cellular domain;
      exchange signaling via the cellular domain with a call session control function in the IMS domain, wherein the signaling comprises an indication of a state of a supplementary service;
   wherein the instructions to exchange further comprise instructions to:
      determine an appropriate dual-tone multi-frequency (DTMF) code that relates to utilizing the supplementary service from a set of DTMF codes outside of call control signaling codes used by the cellular domain for handling calls, wherein the appropriate DTMF code is interpreted by the cellular domain as an end-user application signaling code and is interpreted by the call session control function in the IMS domain as a supplemental service signaling code;
      send the appropriate DTMF code to indicate the state of the supplementary service transparently through the cellular domain to the call session control function in the IMS domain.

6. The device of claim 5, wherein the appropriate DTMF code is embedded along with a voice call portion.

7. The device of claim 5, wherein the supplementary service includes at least one of call waiting, call forwarding, call conferencing, or call hold.

8. The device of claim 5, wherein the indication is handled natively by the cellular domain.

9. The device of claim 5, wherein the multiple access networks include a packet-switched network.

10. The device of claim 9, wherein the packet-switched network includes a wireless LAN.

11. The device of claim 9, wherein the packet-switched network includes a packet-switched cellular network.

12. The device of claim 5, wherein the multiple access networks include a circuit-switched network.

13. The device of claim 12, wherein the circuit switched network includes a 3G cellular network.

14. A computer-readable medium including computer-executable instructions stored thereon, comprising:
   instructions executable to cause a computer to establish a call in a cellular domain having an anchor in a voice call continuity server in an IMS (Internet Protocol Multimedia Subsystem) domain, wherein the call further comprises a call path between a public switched telephone network and the mobile communications device through a media gateway and the cellular domain;

instructions executable to cause the computer to exchange signaling via the cellular domain with a call session control function in the IMS domain, wherein the signaling comprises an indication of a state of a supplementary service;

wherein the instructions to exchange communications further comprise:

instructions executable to cause the computer to determine an appropriate dual-tone multi-frequency (DTMF) code that relates to utilizing the supplementary service from a set of DTMF codes outside of call control signaling codes used by the cellular domain for handling calls, wherein the appropriate DTMF code is interpreted by the cellular domain as an end-user application signaling code and is interpreted by the call session control function in the IMS domain as a supplemental service signaling code; and instructions executable to cause the computer to send the appropriate DTMF code to indicate the state of the supplementary service transparently through the cellular domain to the call session control function in the IMS domain.

15. A mobile communications device capable of communicating over multiple access networks having an IMS (Internet Protocol Multimedia Subsystem) domain in communication with the multiple access networks, the device comprising:

means for establishing a call in a cellular domain having an anchor in a voice call continuity server in an IMS domain, wherein the call further comprises a call path between a public switched telephone network and the mobile communications device through a media gateway and the cellular domain;

means for exchanging signaling via the cellular domain with a call session control function in the IMS domain, wherein the signaling comprises an indication of a state of a supplementary service;

wherein the means for exchanging further comprises:

means for determining an appropriate dual-tone multi-frequency (DTMF) code that relates to utilizing the supplementary service from a set of DTMF codes outside of call control signaling codes used by the cellular domain for handling calls, wherein the appropriate DTMF code is interpreted by the cellular domain as an end-user application signaling code and is interpreted by the call session control function in the IMS domain as a supplemental service signaling code; and means for sending the appropriate DTMF code to indicate the state of the supplementary service transparently through the cellular domain to the call session control function in the IMS domain.

16. The method of claim 1, wherein exchanging communications via the cellular domain further comprises exchanging via a mobile switching center (MSC), and wherein sending the appropriate DTMF code to indicate the state of the supplementary service transparently through the cellular domain further comprises sending through the MSC.

17. The method of claim 1, further comprising utilizing the supplementary service after a handoff between the cellular domain and the IMS domain based on maintaining of the state of the supplementary service by the server in the IMS domain.

18. The device of claim 5, wherein exchanging communications via the cellular domain further comprises exchanging via a mobile switching center (MSC), and wherein sending the appropriate DTMF code to indicate the state of the supplementary service transparently through the cellular domain further comprises sending through the MSC.

19. The device of claim 5, wherein the processor is further configured to execute instructions to utilize the supplementary service after a handoff between the cellular domain and the IMS domain based on maintaining of the state of the supplementary service by the server in the IMS domain.

20. The computer-readable medium of claim 14, further comprising instructions executable to cause the computer to utilize the supplementary service after a handoff between the cellular domain and the IMS domain based on maintaining of the state of the supplementary service by the server in the IMS domain.

21. The device of claim 15, further means for utilizing the supplementary service after a handoff between the cellular domain and the IMS domain based on maintaining of the state of the supplementary service by the server in the IMS domain.

22. A method of maintaining supplementary services for a mobile communications device capable of communicating over one or more access networks, comprising:

exchanging, by a call session control function in an IMS (Internet Protocol Multimedia Subsystem) domain, signaling via a cellular domain with a mobile communications device having a call established in the cellular domain and anchored in a voice call continuity server in the IMS domain, wherein the call has a call path between a public switched telephone network and the mobile communications device through a media gateway and the cellular domain, wherein the signaling comprises an indication of a state of a supplementary service;

wherein the exchanging further comprises:

determining an appropriate dual-tone multi-frequency (DTMF) code that relates to utilizing the supplementary service from a set of DTMF codes outside of call control signaling codes used by the cellular domain for handling calls, wherein the appropriate DTMF code is interpreted by the cellular domain as an end-user application signaling code and is interpreted by the call session control function in the IMS domain as a supplemental service signaling code; and sending the appropriate DTMF code to indicate the state of the supplementary service transparently through the cellular domain to the mobile communications device.

23. The method of claim 22, wherein the appropriate DTMF code is embedded along with a voice call portion.

24. The method of claim 22, wherein the supplementary service includes at least one of call waiting, call forwarding, call conferencing, or call hold.

25. The method of claim 22, wherein the indication is handled natively by the cellular domain.

26. The method of claim 22, wherein exchanging communications via the cellular domain further comprises exchanging via a mobile switching center (MSC), and wherein sending the appropriate DTMF code to indicate the state of the supplementary service transparently through the cellular domain further comprises sending through the MSC.

27. The method of claim 22, further comprising maintaining of the state of the supplementary service by the server in the IMS domain to enable utilizing the supplementary service after a handoff of the mobile communications device between the cellular domain and the IMS domain.

28. A server for maintaining supplementary services for a mobile communications device capable of communicating over one or more access networks, comprising:

a module for exchanging, by a call session control function in an IMS (Internet Protocol Multimedia Subsystem) domain, signaling via a cellular domain with a mobile communications device having a call established in the cellular domain and anchored in a voice call continuity server in the IMS domain, wherein the call has a call path between a public switched telephone network and the mobile communications device through a media gateway and the cellular domain, wherein the signaling comprises an indication of a state of a supplementary service;

wherein the module for exchanging is further configured for:

determining an appropriate dual-tone multi-frequency (DTMF) code that relates to utilizing the supplementary service from a set of DTMF codes outside of call control signaling codes used by the cellular domain for handling calls, wherein the appropriate DTMF code is interpreted by the cellular domain as an end-user application signaling code and is interpreted by the call session control function in the IMS domain as a supplemental service signaling code;

sending the appropriate DTMF code to indicate the state of the supplementary service transparently through the cellular domain to the mobile communications device.

29. The server of claim 28, wherein the appropriate DTMF code is embedded along with a voice call portion.

30. The server of claim 28, wherein the supplementary service includes at least one of call waiting, call forwarding, call conferencing, or call hold.

31. The server of claim 28, wherein the indication is handled natively by the cellular domain.

32. The server of claim 28, wherein the module for exchanging communications via the cellular domain further comprises exchanging via a mobile switching center (MSC), and wherein the module for sending the appropriate DTMF code to indicate the state of the supplementary service transparently through the cellular domain further comprises sending through the MSC.

33. The server of claim 28, further comprising a module for maintaining of the state of the supplementary service by the server in the IMS domain to enable utilizing the supplementary service after a handoff of the mobile communications device between the cellular domain and the IMS domain.

* * * * *